UNITED STATES PATENT OFFICE.

HENRY KUHN, OF ROCHESTER, NEW YORK.

PROCESS FOR PRODUCING TRANSLUCENT PAPER.

938,877. Specification of Letters Patent. Patented Nov. 2, 1909.

No Drawing. Application filed March 30, 1909. Serial No. 486,687.

*To all whom it may concern:*

Be it known that I, HENRY KUHN, a citizen of the United States of America, and resident of Rochester, State of New York, have invented a new and useful Process for Producing Translucent Paper, of which the following is a specification.

The invention relates to a process for producing a paper which shall be completely structureless when penetrated by light in a manner similar to dimmed glass. The paper is intended to act as a substitute for "ground mat" glass and similar substances in the different industries.

The process is as follows:—I employ a paper made of cotton fiber or at least for the greater part of cotton fiber and treat this paper in the known manner with concentrated sulfuric acid in order to make the same into a parchment. The paper is then carefully washed and dried and treated with fatty or waxy substances in the dissolved or melted form. After this the treatment is continued by pressing or rolling the paper at a high temperature. If desired both stages of the treatment of the parchment paper viz. the treatment with fats and waxes and the mechanical treatment may be effected simultaneously. After this treatment the paper is subjected to a dimming process by abrading or rubbing the surface thereof. This may be effected in the known manner, for instance by rubbing in the wet state with pumice stone or by treatment with sand blast or the like. The paper obtained in this way is of such a fine grain that when penetrated by light it appears practically without structure.

The paper is of special use as the carrying layer for emulsions in the making of photographic films. It has already been proposed to manufacture films by pouring emulsions on paper and all such paper films had the objection that the copies from the negative showed up the internal structure of the paper. This objection is totally absent when the paper is treated in the manner described above and therefore this paper is specially suitable for use in the manufacture of films.

I claim:—

1. The process for producing a structureless translucent paper consisting in making a parchment paper from a paper made with cotton fiber, washing and drying said parchment paper, treating said paper with a fatty substance to render it translucent, subjecting such parchment paper to a high pressure at a high temperature and subsequently dimming said paper.

2. The process for producing a translucent structureless paper, consisting in treating a paper made with cotton fiber with concentrated sulfuric acid so as to make it into a parchment paper, washing and drying said paper, treating it with a wax and simultaneously rolling said parchmented and wax paper at a high temperature and then producing a dim mat surface on said paper by abrading the same.

In witness whereof I have hereunto set my hand in the presence of two witnesses.

HENRY KUHN.

Witnesses:
W. F. WORRALL,
RAYMOND V. ELLIS.